UNITED STATES PATENT OFFICE.

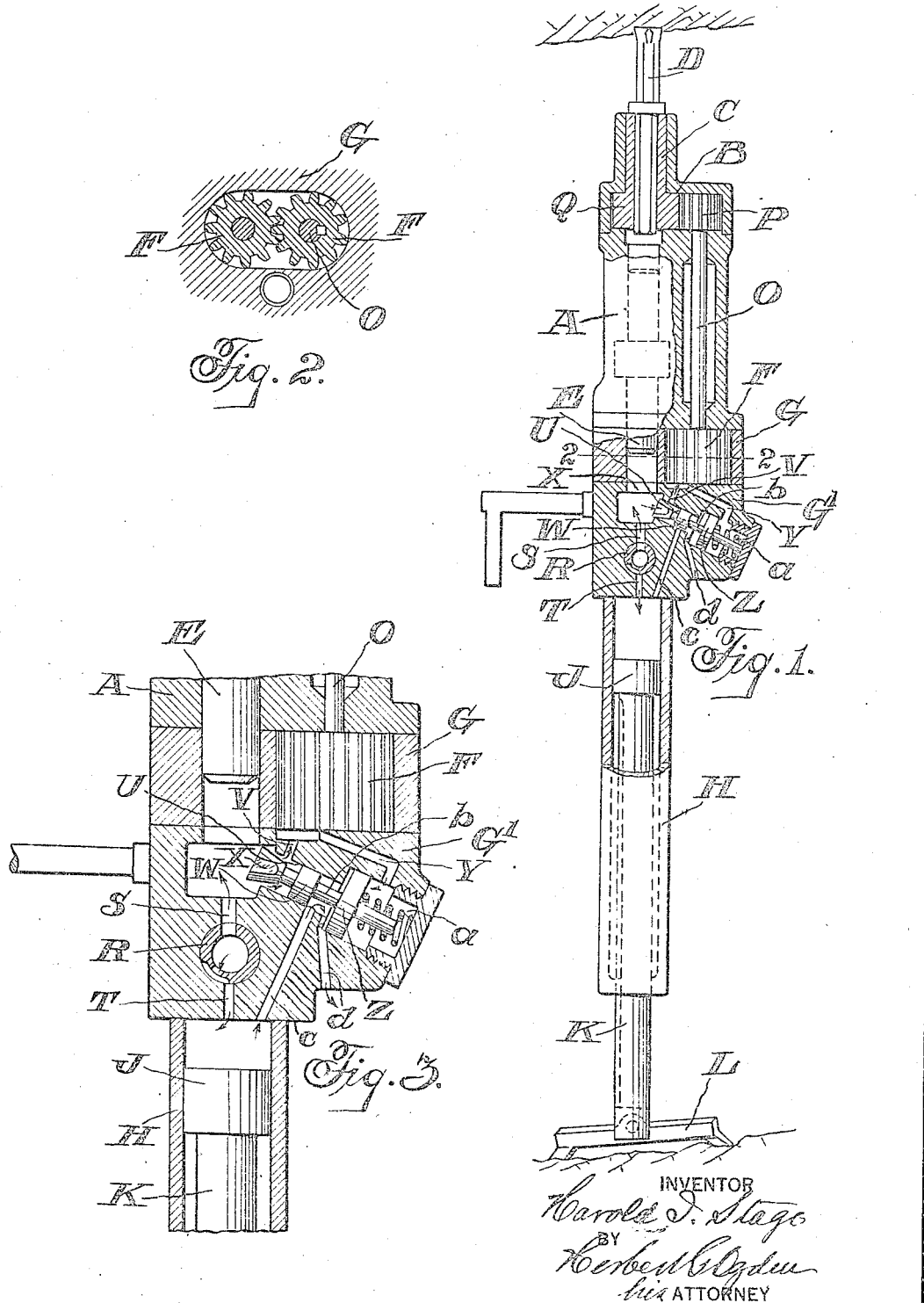

HAROLD I. STAGE, OF EASTON, PENNSYLVANIA, ASSIGNOR TO INGERSOLL-RAND COMPANY, OF JERSEY CITY, NEW JERSEY, A CORPORATION OF NEW JERSEY.

AUTOMATIC AIR-FEED CONTROL FOR ROCK DRILLS.

1,407,599.

Specification of Letters Patent.   Patented Feb. 21, 1922.

Application filed February 16, 1921. Serial No. 445,483.

*To all whom it may concern:*

Be it known that I, HAROLD I. STAGE, a citizen of the United States, and a resident of Easton, Northampton County, State of Pennsylvania, have invented a certain Automatic Air-Feed Control for Rock Drills, of which the following is a specification.

This invention relates to fluid pressure rock drills of the hammer type, but more particularly to automatic air feed control for the feeding element which advances the machine. The invention is especially applicable to a stope drill, although it may advantageously be used in connection with drifters and other types of rock drills for drilling horizontal and down holes, provided with an independent rotation motor.

In operating a stope drill for instance, which may be taken as an illustrative example, if a soft spot is encountered, the power of the air feed should ordinarily be reduced, but full rotation and hammer power retained, or if possible, increased rotation should be produced, to enable the machine to operate in the most efficient manner.

These variations in the air feed control have heretofore been effected by hand to suit the conditions of the work, and one object of the present invention is to enable the air feeding element to be automatically controlled substantially without hand regulation after the drilling is started.

Another object is to effect such control by automatic means responsive to the resistance to the rotation for automatically varying the pressure in the air feed cylinder of the feeding element.

In accordance with my invention, I have devised automatic means preferably responsive to the speed of the rotation motor for controlling the air feed. Such regulating means are also responsive to the pressure in the motor, and thus may be said to be responsive to or affected by the torque of the motor, because as the resistance to rotation increases and the rotation motor slows down, the pressure in the motor increases and I am enabled to automatically control the air feed of the machine and the power of the motor in accordance with such changes in torque.

Automatic regulation and control of the air feed renders the machine more sensitive to drilling conditions than can be obtained with hand control and the machine will respond automatically to the requirements more quickly than with hand control. This tends to avoid sticking, but if the steel does stick, my automatic devices have been found to quickly free the steel in cases in which the steel cannot be freed by manual adjustments of the motor and air feed, because the automatic devices have proved to be more effective and better adapt the machine to its work than human agencies.

Since the operator is not required to keep one hand on the rotation handle, nor adjust controlling valves to control the air feed, he may stand aside, in using a stope drill for instance, and he is not subjected to the annoyance and discomfort of dripping sludge and cleaning water in the case of wet drilling, which is a material advantage for the operator.

Further objects of the invention will hereinafter appear and the invention is illustrated in one of its preferred forms in the accompanying drawings in which, Figure 1 is a side elevation, partly in vertical section of a stope drill illustrating the invention;

Figure 2 is a detail diagrammatic horizontal sectional view through the rotation motor on the line 2—2 of Figure 1; and Figure 3 is an enlarged detail vertical sectional view taken through the controlling devices showing the automatic controlling valve in a different position from that indicated in Figure 1.

Referring to the drawings, a stope drill is illustrated in the figures having a cylinder A and front head B provided with the rotation sleeve C through which the drill steel D extends in position to receive the impact blows of the hammer E. An independent fluid actuated rotation motor is shown in this instance for rotating the drill steel, a gear motor being indicated having the gears F, only one of which is shown in Figure 1, in the motor casing formed by the back end portion G of the cylinder. The head block G' is shown located between the cylinder portion G and the fluid pressure feed cylinder H having the piston J and piston rod K provided with the rock engaging claw L. The feed cylinder is preferably slidably but non-rotatably connected to the piston by suitable means. One of the gears F and the motor is operatively connected through a suitable shaft O and pinion P meshing with the gear Q on the rotation sleeve C for rotating the drill steel. The cylinder A, back end portion or motor casing G, head block G' and feed cylinder H are adapted to be held together by any suitable means (not shown).

Fluid pressure, as live air, is supplied to the machine through the throttle valve R, and passes through the admission port S controlled by the throttle, to the percussive element and also through the small port T to the feed cylinder. Fluid also passes to the rotation motor through the valve chamber U and the admission port V controlled in this instance by substantially the same automatic regulating valve W which forms the subject matter of an application for patent, Serial No. 361,758, filed February 27, 1920, by Lewis C. Bayles, and Fred M. Slater. This valve W need not be further described, than to say that it is provided with a tapered and fluted head X which graduates the admission of fluid pressure to the rotation motor, and increased back pressure from the motor, due for instance to resistance to rotation, through the port Y on the plunger head Z, assisted by the light spring $a$, tends to open the valve wider and admit more pressure to the motor as required. A corresponding reduction of pressure on the plunger head Z, due to increased speed of the motor, permits the tapered head X of the valve to move inward against the light spring pressure and reduce the supply of the motor as required. The automatic valve shown is merely to be taken as an illustrative example and I am not to be understood as limiting the invention to any particular type of valve.

The plunger head Z of the valve W may conveniently be separated from the body of the valve by a slight distance on the valve stem $b$ to afford a suitable space in the wall of the valve casing for the location of a passage $c$ leading from the air feed cylinder H to the valve chamber, and also affording a location for the atmospheric port $d$ which communicates with the passage $c$ when said passage is uncovered by the valve W. The valve W controls the relief passage $c$, which is shown closed in Figure 1 and open in Figure 2, in which latter case the pressure in the air feed cylinder is automatically relieved.

In the operation of the device, sufficient resistance to rotation producing increased torque in the motor, increases the pressure in the admission side of the motor, which causes the valve to move outwardly as shown, or to a more widely open position, and this opening movement is sufficient in accordance with the requirements of the work, to increase the power of the motor and at the same time uncover the passage $c$ and relieve the pressure in the air feed cylinder H until the drill steel has worked free again or until the resistance to rotation has reduced, so that the valve W may automatically return to position for normal running with full air feed pressure. Such automatic operation and drilling will continue even when the gauge of the drill steel has worn down to a degree which would ordinarily render the steel useless, prevent rotation due to sticking and require the insertion of a new and sharp steel with full gauge.

I claim:

1. In a rock drill of the hammer type, the combination of means for rotating the drill steel, means for feeding the steel, and means responsive to the resistance to rotation for automatically controlling the feeding means.

2. In a rock drill of the hammer type, the combination of means for rotating the drill steel, pressure actuated means for feeding the steel, and means responsive to the resistance to rotation for automatically controlling the pressure in the feeding means.

3. In a rock drill of the hammer type, the combination of means for rotating the drill steel, an air feeding element comprises a cylinder and piston for advancing the machine and means responsive to the resistance to rotation for automatically controlling the pressure in the air feed cylinder.

4. In a rock drill of the hammer type, the combination of an independent motor for rotating the drill steel, an air feeding element comprises a cylinder and piston for advancing the machine, and means responsive to the resistance to rotation for automatically controlling the pressure in the air feed cylinder.

5. In a rock drill of the hammer type, the combination of an independent motor for rotating the drill steel, an air feeding element comprises a cylinder and piston for advancing the machine, and means responsive to the speed of the motor for automatically controlling the pressure in the air feed cylinder.

6. In a rock drill of the hammer type, the combination of an independent motor for rotating the drill steel, an air feeding element comprises a cylinder and piston for advancing the machine, and means responsive to the pressure in the motor for automatically controlling the pressure in the air feed cylinder.

7. In a rock drill of the hammer type, the combination of an independent motor for rotating the drill steel, an air feeding element comprises a cylinder and piston for advancing the machine, and means responsive to the torque of the motor for automatically controlling the pressure in the air feed cylinder.

8. In a rock drill of the hammer type, the combination of an independent motor for rotating the drill steel, an air feeding element comprises a cylinder and piston for advancing the machine, a pressure actuated valve for automatically controlling the power delivered to the motor in accordance with the requirements of the work, and means controlled by said valve for automatically regulating the pressure in the air feed cylinder.

In testimony whereof I have signed this specification.

HAROLD I. STAGE.